United States Patent

(12) United States Patent
Wang

(10) Patent No.: US 12,102,904 B2
(45) Date of Patent: Oct. 1, 2024

(54) GAME CONTROL METHOD BASED ON A SMART BRACELET, SMART BRACELET AND STORAGE MEDIUM

(71) Applicant: GOERTEK INC., Shandong (CN)

(72) Inventor: Fenqing Wang, Shandong (CN)

(73) Assignee: GOERTEK INC., Shandong (CN)

( * ) Notice: Subject to any disclaimer, the term of this patent is extended or adjusted under 35 U.S.C. 154(b) by 276 days.

(21) Appl. No.: 17/437,352

(22) PCT Filed: Dec. 3, 2019

(86) PCT No.: PCT/CN2019/122774
§ 371 (c)(1),
(2) Date: Sep. 8, 2021

(87) PCT Pub. No.: WO2020/186826
PCT Pub. Date: Sep. 24, 2020

(65) Prior Publication Data
US 2022/0143493 A1 May 12, 2022

(30) Foreign Application Priority Data

Mar. 15, 2019 (CN) .......................... 201910197022.4

(51) Int. Cl.
*A63F 13/211* (2014.01)
*A63F 13/212* (2014.01)
(Continued)

(52) U.S. Cl.
CPC .......... *A63F 13/211* (2014.09); *A63F 13/212* (2014.09); *A63F 13/213* (2014.09);
(Continued)

(58) Field of Classification Search
CPC .... A63F 13/211; A63F 13/213; A63F 13/212; A63F 13/428; G06V 40/113; G06V 40/28; G06F 3/014; G06F 3/017
See application file for complete search history.

(56) References Cited

U.S. PATENT DOCUMENTS 9,864,434 B2    1/2018  Wang et al.
10,742,792 B2 *  8/2020  Ryu ........................ G06F 1/163
(Continued)

FOREIGN PATENT DOCUMENTS

CN    103777752 A    5/2014
CN    104826331 A    8/2015
(Continued)

OTHER PUBLICATIONS

Google Patents Machine Translation for CN106598251A, Intelligent Bracelet with Gesture Control function, pp. 1-25, Zhou Huixiang (Year: 2014).*

*Primary Examiner* — Omkar A Deodhar
*Assistant Examiner* — Shauna-Kay Hall
(74) *Attorney, Agent, or Firm* — LKGlobal | Lorenz & Kopf, LLP

(57) ABSTRACT

A game control method comprises: when the smart bracelet enters a game control mode, acquiring first posture data according to a motion posture of the smart bracelet detected by an inertial sensor; when an event for starting finger manipulation occurs, collecting a gesture made by a user finger by using a camera; if the gesture collected by the camera is a posture controlling gesture, acquiring second posture data from the gesture collected by the camera; and performing posture control on a target object in a game scene according to the second posture data and the first posture data. The posture control can be performed on a target object in the game scene by jointly using the camera and the inertial sensor which are complementary, thereby (Continued)

greatly improving the accuracy of posture control and effectively enhancing the game manipulation experience.

9 Claims, 3 Drawing Sheets

(51) Int. Cl.
  *A63F 13/213*  (2014.01)
  *A63F 13/428*  (2014.01)
  *G06F 3/01*  (2006.01)
  *G06V 40/10*  (2022.01)
  *G06V 40/20*  (2022.01)

(52) U.S. Cl.
  CPC ............ *A63F 13/428* (2014.09); *G06F 3/014* (2013.01); *G06F 3/017* (2013.01); *G06V 40/113* (2022.01); *G06V 40/28* (2022.01)

(56) References Cited

U.S. PATENT DOCUMENTS

| | | | |
|---|---|---|---|
| 11,592,907 B2* | 2/2023 | Wu | G06F 1/3228 |
| 11,644,799 B2* | 5/2023 | Lake | G06F 3/014 345/174 |
| 2015/0062086 A1* | 3/2015 | Nattukallingal | G06F 3/017 345/175 |
| 2015/0258431 A1* | 9/2015 | Stafford | G06F 3/014 463/31 |
| 2016/0018872 A1* | 1/2016 | Tu | G06F 3/017 345/173 |
| 2016/0132286 A1* | 5/2016 | Wu | G06F 3/165 715/716 |
| 2016/0370767 A1* | 12/2016 | Huang | G04B 47/06 |
| 2017/0285756 A1* | 10/2017 | Wang | G06F 3/0346 |
| 2017/0315620 A1* | 11/2017 | Johri | G06T 7/70 |
| 2017/0351345 A1* | 12/2017 | Nirjon | G06F 3/014 |
| 2018/0062691 A1* | 3/2018 | Barnett, Jr. | G06F 3/167 |
| 2018/0104573 A1* | 4/2018 | Jeffery | A63F 13/40 |
| 2019/0286224 A1* | 9/2019 | De Nardi | G06F 3/011 |
| 2020/0285322 A1* | 9/2020 | Johri | G06F 3/0233 |
| 2021/0311553 A1* | 10/2021 | Keller | G06T 19/006 |

FOREIGN PATENT DOCUMENTS

| | | |
|---|---|---|
| CN | 204631771 U | 9/2015 |
| CN | 105765491 A | 7/2016 |
| CN | 106598251 A | 4/2017 |
| CN | 206404297 U | 8/2017 |
| CN | 108668010 A | 10/2018 |
| CN | 109240490 A | 1/2019 |
| CN | 110102044 A | 8/2019 |
| WO | 2016079774 A1 | 5/2016 |

* cited by examiner

GAME CONTROL METHOD BASED ON A SMART BRACELET, SMART BRACELET AND STORAGE MEDIUM

CROSS-REFERENCE TO RELATED APPLICATION

This application is a U.S. National-Stage entry under 35 U.S.C. § 371 based on International Application No. PCT/CN2019/122774, filed Dec. 3, 2019 which was published under PCT Article 21(2) and which claims priority to Chinese Application No. 201910197022.4, filed Mar. 15, 2019, which are all hereby incorporated herein in their entirety by reference.

TECHNICAL FIELD

This Application pertains to the technical field of intelligent control, in particular to a game control method based on a smart bracelet, a smart bracelet and a storage medium.

BACKGROUND

At present, electronic games typically must use a game handle for game control. However, the volume of the game handle is usually large, so its portability is poor, and the player cannot experience the fun of the game anytime and anywhere.

With the rapid development of smart wearable devices, the smart bracelet having advantages such as being portable and smart has been introduced into the field of game control. However, in practical applications, the manipulation accuracy of the smart bracelet on games is relatively low, which results in poor manipulation experience of the player. In addition, other objects, desirable features and characteristics will become apparent from the subsequent summary and detailed description, and the appended claims, taken in conjunction with the accompanying drawings and this background.

SUMMARY

Various aspects of the present disclosure provide a game control method based on a smart bracelet, a smart bracelet, and a storage medium, so as to improve the game manipulation accuracy of the smart bracelet.

The embodiments of the present disclosure provide a game control method based on a smart bracelet, comprising:
  when the smart bracelet enters a game control mode, acquiring first posture data according to a motion posture of the smart bracelet detected by an inertial sensor; when an event for starting finger manipulation occurs, collecting a gesture made by a user finger by using a camera;
  if the gesture collected by the camera is a posture controlling gesture, acquiring second posture data from the gesture collected by the camera; and
  performing posture control on a target object in a game scene according to the second posture data and the first posture data.

The embodiments of the present disclosure further provide a smart bracelet, comprising a controller, an inertial sensor, and a camera; wherein
  the camera faces toward the direction of the user finger when the smart bracelet is in a worn state;
  the controller is for:
    when the smart bracelet enters a game control mode, acquiring first posture data according to a motion posture of the smart bracelet detected by the inertial sensor;
    when an event for starting finger manipulation occurs, collecting a gesture made by a user finger by using the camera;
    if the gesture collected by the camera is a posture controlling gesture, acquiring second posture data from the gesture collected by the camera; and
    performing posture control on a target object in a game scene according to the second posture data and the first posture data.

The embodiments of the present disclosure further provide a computer readable storage medium storing computer instructions, wherein when executed by one or more processors, the computer instructions cause the one or more processors to perform the game control method as stated above.

In the embodiments of the present disclosure, when the smart bracelet enters the game control mode, the first posture data can be acquired according to the motion posture of the smart bracelet detected by the inertial sensor; the second posture data can be acquired from the posture controlling gesture collected by the camera, and the posture control can be performed on a target object in the game scene according to the second posture data and the first posture data. Therefore, in the embodiments of the present disclosure, the posture control can be performed on a target object in the game scene by jointly using the camera and the inertial sensor which are complementary, thereby greatly improving the accuracy of posture control and effectively enhancing the game manipulation experience.

BRIEF DESCRIPTION OF DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The technical solutions of the embodiments of the present disclosure will be described in conjunction with the accompanying drawings. Obviously, the embodiments described are only part of the embodiments of the present disclosure, rather than all of the embodiments. Based on the embodiments in the present disclosure, all other embodiments obtained by a person of ordinary skill in the art without paying creative efforts shall fall within the protection scope of the present disclosure.

At present, the manipulation accuracy of the smart bracelet on games is relatively low, which results in poor manipulation experience of the player. In order to solve the problems in the prior art, in some embodiments of the present disclosure, when the smart bracelet enters the game control mode, the first posture data can be acquired according to the motion posture of the smart bracelet detected by the inertial sensor; the second posture data can be acquired from the posture controlling gesture collected by the camera, and the posture control can be performed on a target object in the game scene according to the first posture data and the second posture data. Therefore, in the embodiments of the present disclosure, the posture control can be performed on a target object in the game scene by jointly using the camera and the inertial sensor which are complementary, thereby greatly improving the accuracy of posture control and effectively enhancing the game manipulation experience.

The technical solutions according to the embodiments of the present disclosure will be described in detail below in conjunction with the accompanying drawings.

Figure 1:
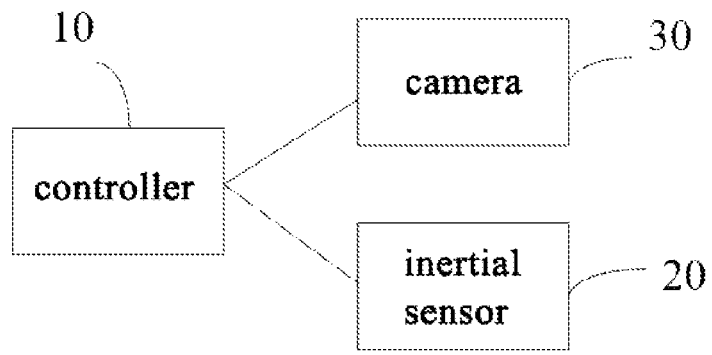
FIG. 1 is a schematic diagram of the structure of a smart bracelet according to an embodiment of the present disclosure.

FIG. 1 is a schematic diagram of the structure of a smart bracelet according to an embodiment of the present disclosure. As shown in FIG. 1, the smart bracelet comprises a controller 10, an inertial sensor 20, and a camera 30.

In the present embodiment, in addition to the game control function according to the present embodiment, the smart bracelet may have other product functions such as heart rate monitoring, voice call, etc., which are not limited in the present embodiment. In practical applications, in order to achieve switching between different product functions of the smart bracelet, various product function modes can be set for the smart bracelet, and the user can turn on them as needed. For example, when game control is required, the user may turn on the game control mode of the smart bracelet. When the smart bracelet enters the game control mode, the smart bracelet may interface with the gaming environment through the associated software and hardware, such as accessing a game scene, establishing a linkage coordinate system, and the like, which will not be described in detail herein.

Based on this, when the smart bracelet enters the game control mode, the controller 10 may acquire the first posture data according to the motion state of the smart bracelet detected by the inertial sensor 20.

Figure 2:
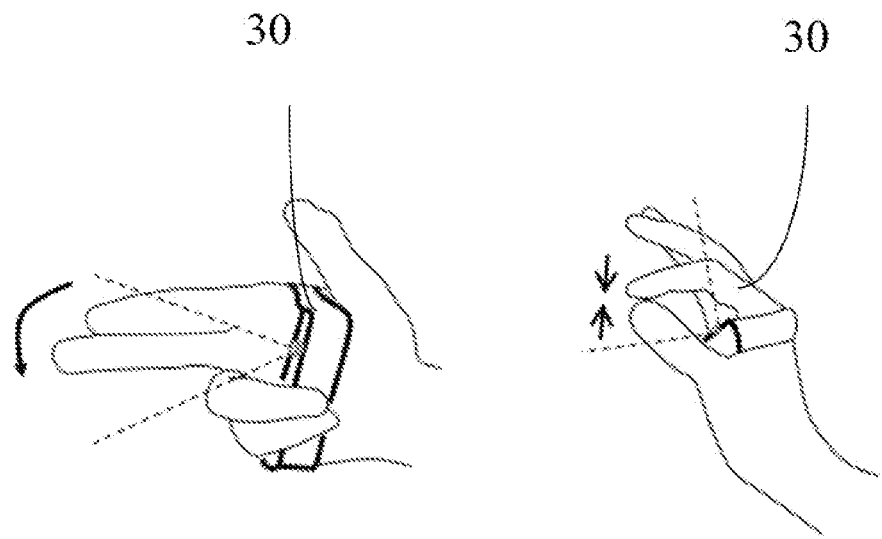
FIG. 2 is a schematic diagram of a wearing state when a smart bracelet is worn on a palm of a user according to an embodiment of the present disclosure.

In the present embodiment, the smart bracelet may be worn on the wrist or palm of the user. FIG. 2 is a schematic diagram of a wearing state when a smart bracelet is worn on a palm of a user according to an embodiment of the present disclosure. As shown in FIG. 2, the smart bracelet is worn on the palm of the user and moves with the palm of the user. For example, when the user's palm translates in the space, the smart bracelet will also translate synchronously. In this process, the inertial sensor 20 of the smart bracelet may detect the motion posture of the smart bracelet, and the controller 10 may acquire the first posture data determined based on the inertial sensor 20 accordingly.

Based on the first posture data, the controller 10 may perform posture control on a target object in the game scene. In the above example, when the palm of the user translates in the space, the target object in the game scene will also follow the user's palm and be in a translating state.

For some game scenarios requiring high manipulation accuracy, for example, a shooting game scenario, since there is a drifting phenomenon in the inertial sensor 20, the manipulation accuracy cannot reach the expected effect, and the manipulation experience of the user is poor and even cannot be manipulated. In order to deal with these game scenarios with high requirements for manipulation accuracy, in the present embodiment, the camera 30 is provided for the smart bracelet. As shown in FIG. 2, when the smart bracelet is in the worn state, the camera 30 faces toward the direction of the user finger, and the user finger is located within the image collection range of the camera.

In the present embodiment, when an event for starting finger manipulation occurs, the controller 10 may collect a gesture made by a user finger by using the camera 30.

The event for starting finger manipulation may be a physical key trigger event or a control trigger event in a game scene, etc., which is not limited in the present embodiment. That is, when the high accuracy game control is required, the camera 30 may be activated to collect a gesture made by a user finger. For example, a physical key may be provided on the smart bracelet, and the user may press a physical key to trigger the event for starting finger manipulation. For another example, the user may also trigger a related control in the game scene to trigger the event for starting finger manipulation.

In the present embodiment, the controller 10 may utilize the camera 30 to collect a user gesture image, and the time granularity for collecting may be flexibly set according to factors such as the required manipulation accuracy and the processing capability of the controller 10. The controller 10 may identify a gesture made by a user finger included in the user gesture image based on the image processing technology and analyze the identified gesture.

In some practical applications, a gesture library may be created in advance to record preset gestures such as posture controlling gestures and instructional gestures in the gesture library. The gesture library may be stored locally in the smart bracelet, and of course may also be stored in the network. The smart bracelet may use a gesture library through the network when needed. The controller 10 may analyze the attributes of the gesture collected by the camera 30 based on the gesture library. For example, if the gesture collected by the camera 30 matches any posture controlling gesture in the gesture library, it is determined that the gesture collected by the camera 30 is a posture controlling gesture.

When it is determined that the gesture collected by the camera 30 is the posture controlling gesture, the second gesture data may be acquired from the gesture collected by the camera 30. For example, if the gesture shown on the left side in FIG. 2 is a posture controlling gesture, the controller 10 may obtain the second gesture data from the gesture collected by the camera 30.

Accordingly, in the present embodiment, the posture control is performed on a target object in the game scene according to the first posture data and the second posture data. Since the posture manipulation accuracy of the inertial sensor 20 is low, the posture control effect of the inertial sensor 20 can be corrected by the posture controlling gesture collected by the camera 30.

In the embodiments of the present disclosure, when the smart bracelet enters the game control mode, the first posture data can be acquired according to the motion posture of the smart bracelet detected by the inertial sensor 20; the second posture data can be acquired from the posture controlling gesture collected by the camera 30, and the posture control can be performed on a target object in the game scene according to the first posture data and the second posture data. Therefore, in the embodiments of the present disclosure, the posture control can be performed on a target object in the game scene by jointly using the camera and the inertial sensor which are complementary, thereby greatly improving the accuracy of posture control and effectively enhancing the game manipulation experience.

In the above or following embodiments, the controller 10 may acquire a plurality of user gesture images including gestures collected by the camera 30, and the plurality of user gesture images are collected continuously; based on the image processing technology, a motion posture of the user finger under the gesture is identified from a plurality of user gesture images; and the second posture data is generated according to the motion posture of the user finger under the gesture that has been identified.

Taking the current collecting moment as the starting point, the controller 10 may acquire the user gesture image collected by the camera 30 at the current collecting moment and the user gesture image at the next collecting moment, and if the user gesture image at the next collecting moment still includes the posture controlling gesture, identify the motion posture of the user finger under the gesture based on the difference of the gesture in the two user gesture images.

For example, for the gesture shown in FIG. 2, when the user finger swings toward the palm, the controller 10 may determine the motion posture of the user finger under the gesture according to the above processing and generate the second posture data accordingly.

In a practical application, the controller 10 may convert a motion posture of a user finger under a gesture into displacement change data and angle change data, and generate the second posture data according to the displacement change data and the angle change data obtained by conversion.

In the above example, when the user finger in FIG. 2 swings toward the palm, the displacement change data and the angle change data of the finger tip can be calculated, and the displacement change data and the angle change data of the finger of the user can be converted into displacement change data and angle change data of the target object in the game scene according to the posture conversion ratio between the smart bracelet and the target object in the game scene, so as to generate the second posture data.

In the present embodiment, based on the image processing technology, the motion posture of the user finger under the posture controlling gesture may be analyzed based on the user gesture image collected by the camera 30 to generate the second posture data. Due to the fact that the image processing does not involve drifting, the accuracy of the second posture data determined thereby is higher, and therefore, the posture controlling can be performed more accurately on the target object in the game scene by the posture controlling gesture made by the user finger, thereby solving the problem of insufficient manipulation accuracy caused by the drifting problem of the inertial sensor 20.

In the above or following embodiments, the controller 10 may superimpose the first posture data and the second posture data to obtain target posture data, and perform posture control on the target object in the game scene according to the target posture data.

In the present embodiment, based on the first posture data and the second posture data, the target posture data may be obtained by weighted summation of the posture data. When the target object in the game scene is subjected to posture control according to the target posture data, the posture control effect obtained will be the sum of the posture control effect of the inertial sensor 20 and the posture control effect of the posture controlling gesture on the target object.

Take the shooting game as an example, and take the aiming point as the target control object, when the user wears the smart bracelet to perform posture control on the aiming point, if the user controls the smart bracelet to move 1 cm in the 45° direction of the upper left, the first posture data may be to move 2 cm in the 20° direction of the upper left due to the drifting problem of the inertial sensor 20. At the same time, the user may use the gesture on the left side of FIG. 2 to perform the posture control on the aiming point, and if the user finger moves 1 cm in the 45° direction of the upper left, the second posture data is to move 1 cm in the 45° direction of the upper left. By weighted summation of the first posture data and the second posture data, the target posture data obtained may be to move 1.1 cm in the 40° direction of the upper left. Thus, the posture control can be performed on the aiming point according to the target posture data, and obviously the manipulation accuracy is higher than using the inertial sensor 20 alone to perform the posture control on the aiming point.

Of course, in the present embodiment, the implementation of posture control on the target object in the game scene is not limited to the superimposition of posture data, and other implementations may be used. For example, the posture control may be performed on the target object in the game scene according to the first posture data first, then the posture control process of the inertial sensor 20 is paused, and the posture control may be performed on the target object in the game scene according to the second posture data based on the posture control result corresponding to the first posture data. In the above example, when the aiming point moves to a specified area in the game scene based on the posture control of the inertial sensor 20, the posture control process of the inertial sensor 20 may be stopped, and the posture control of the posture controlling gesture collected by the camera 30 is performed so that the posture control effect of the aiming point in the above example can be infinitely close to moving 1 cm in the 45° direction of the upper left. Of course, in the present embodiment, it is not limited, and the specific implementation used in performing the posture control on the target object may be flexibly set according to actual needs.

In the above or below embodiments, as mentioned previously, in addition to the posture controlling gestures, the instructional gestures may also be recorded in the gesture library. The instructional gesture refers to a gesture that can characterize the operational instruction; it differs from the posture controlling gesture. Operational instructions that may be characterized by instructional gestures include, but are not limited to, picture scaling, click, switch, and the like, which are not listed exhaustively herein.

Thus, in the present embodiment, if the gesture collected by the camera 30 is an instructional gesture, the target operational instruction corresponding to the gesture collected by the camera 30 is determined based on a preset correspondence between instructional gestures and operational instructions; the instruction control is performed on the game scene according to the target operational instruction; and the posture control is performed on a target object in the game scene according to the first posture data.

In the present embodiment, similarly to identifying the posture controlling gesture, the controller 10 may also identify an instructional gesture from the user gesture image collected from the camera 30 based on the image processing technology. For example, if the gesture collected by the camera 30 matches any one of the instructional gestures in the gesture library, it is determined that the gesture collected by the camera 30 is an instructional gesture.

Moreover, the correspondence between the instructional gestures and the operational instructions may also be preset in the gesture library, and based on the image processing technology, the instructional gesture corresponding to the gesture collected by the camera 30 can be determined, and thus the operational instruction corresponding to the gesture can be further determined. In addition, some operational instructions may be characterized by gestures and actions of a user finger under a respective instructional gesture. For example, the gesture shown on the right side of FIG. 2 is an instructional gesture, and a pinch action of the user finger may characterize a picture zooming-out instruction. Thus, in the present embodiment, by referring to the identifying process of the posture controlling gesture, the instructional gesture and the gesture action of the user finger under the instructional gesture may be identified from the plurality of user gesture images, so that when two characterization factors are satisfied, the game scene is controlled according to the determined operational instruction. In the above example, when the pinching action made by the user finger under the instructional gesture shown in FIG. 2 is detected, the game scene can be zoomed-out and controlled.

In addition, when the camera 30 fails to collect the posture controlling gesture, the posture control may be performed on the target object in the game scene according to the first posture data, and of course, the instruction control and posture control in the present embodiment do not conflict, and the two game control dimensions can act synchronously in the game scene.

In the present embodiment, the instructional gesture is collected through the camera 30, the instruction control can be more flexibly performed on the game scene, and the operation flexibility and convenience of the user during game control by using the smart bracelet can be effectively improved. Moreover, the functions such as the joystick, the function key and the like of a traditional game handle can all be realized by gestures made by a user finger, so that the user can achieve the user experience and effect by a smart bracelet that cannot be achieved by a game handle such as single hand operation, fine motion manipulation and the like.

In the above or following embodiments, the controller 10 may comprise a first processor and a second processor. When the event for starting finger manipulation occurs, the second processor enters a turned-off state, and the first processor is configured to acquire first posture data according to the motion posture of the smart bracelet detected by the inertial sensor 20; when the gesture collected by the camera 30 is a posture controlling gesture, the second posture data is acquired from the gesture collected by the camera 30; and the posture control is performed on a target object in the game scene according to the second posture data and the first posture data. When an event for ending finger manipulation occurs, the first processor enters a turned-off state, and the second processor is configured to acquire first posture data according to the motion posture of the smart bracelet detected by the inertial sensor 20; and the posture control is performed on a target object in the game scene according to the first posture data. The first processor has a greater processing capability than the second processor.

In the present embodiment, when the event for starting finger manipulation occurs, the first processor is turned on and the second processor is turned off, and the first processor executes the operations such as acquiring the first posture data, acquiring the second posture data, and performing the posture control on the target object according to the first posture data and the second posture data. When an event for ending finger manipulation occurs, the second processor is turned on and the first processor is turned off, and the second processor executes the operations such as acquiring the first posture data, and performing the posture control on the target object according to the first posture data.

Since the processing capability of the first processor is greater than the second processor, when an image processing is needed, the first processor may be turned on to support the image processing; and when no image processing is needed, the second processor may be used to reduce the resource consumption.

By flexible switching of the first processor and the second processor, the power consumption of the processor can be reduced while ensuring smooth realization of the game control function.

Figure 3:
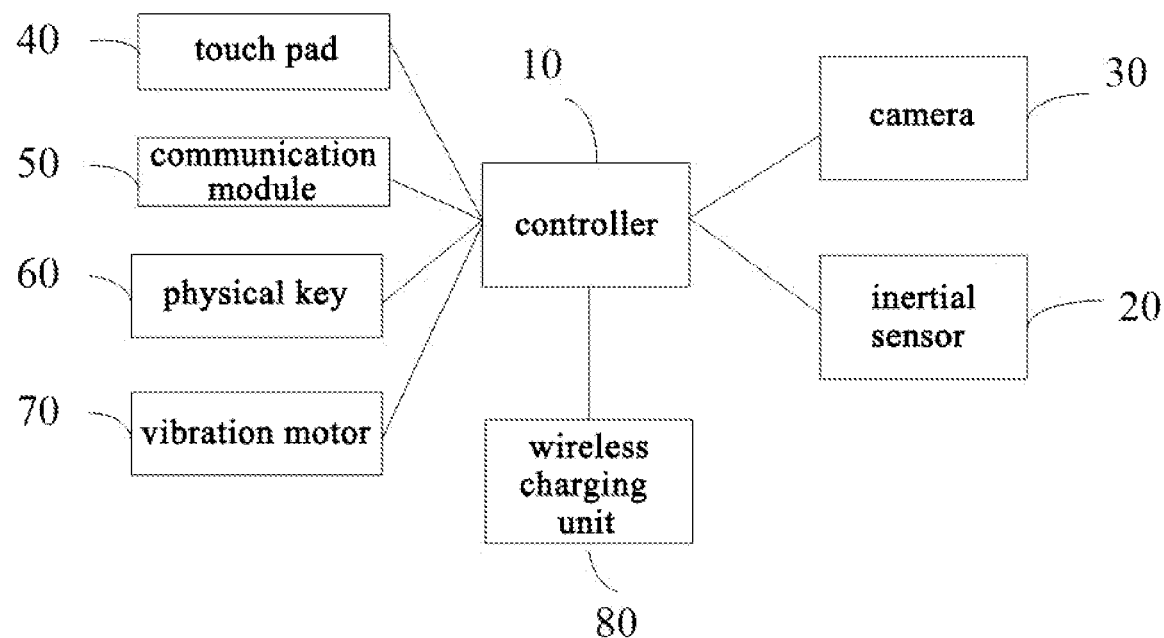
FIG. 3 is a schematic diagram of the structure of another smart bracelet according to an embodiment of the present disclosure.

FIG. 3 is a schematic diagram of the structure of another smart bracelet according to an embodiment of the present disclosure. In the present embodiment, besides the controller 10, the inertial sensor 20, the camera 30, etc. mentioned in the previous embodiments, the smart bracelet may further comprise a touch pad 40, a communication module 50, a physical key 60, a vibration motor 70, etc. The touch pad 40 may be used to implement a joystick function of a conventional game pad, the vibration motor 70 may be used to implement a haptic feedback function, and the physical key 60 may implement various customized key functions. Of course, the various components of the smart bracelet shown in FIG. 3 are exemplary, and the present embodiments are not limited thereto. FIG. 3 should not constitute a limitation to the scope of the present embodiment.

In addition, in the present embodiment, in order to prevent the power consumption of the first processor from being too high to reduce the parameters of the smart bracelet such as the standby time, a wireless charging unit 80 may be additionally provided for the smart bracelet, and the wireless charging unit 80 can be used for charging the smart bracelet with an external power source, thereby prolonging the standby time of the smart bracelet.

Figure 4:
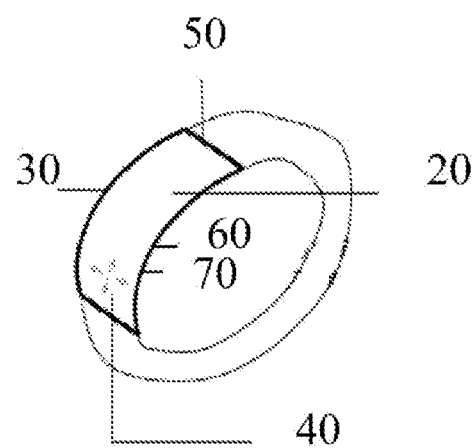
FIG. 4 is a schematic diagram of a product form of a smart bracelet according to an embodiment of the present disclosure.

FIG. 4 is a schematic diagram of a product form of a smart bracelet according to an embodiment of the present disclosure. It should be understood, however, that the product form of the smart bracelet according to the embodiments of the present disclosure is not limited thereto.

Figure 5:
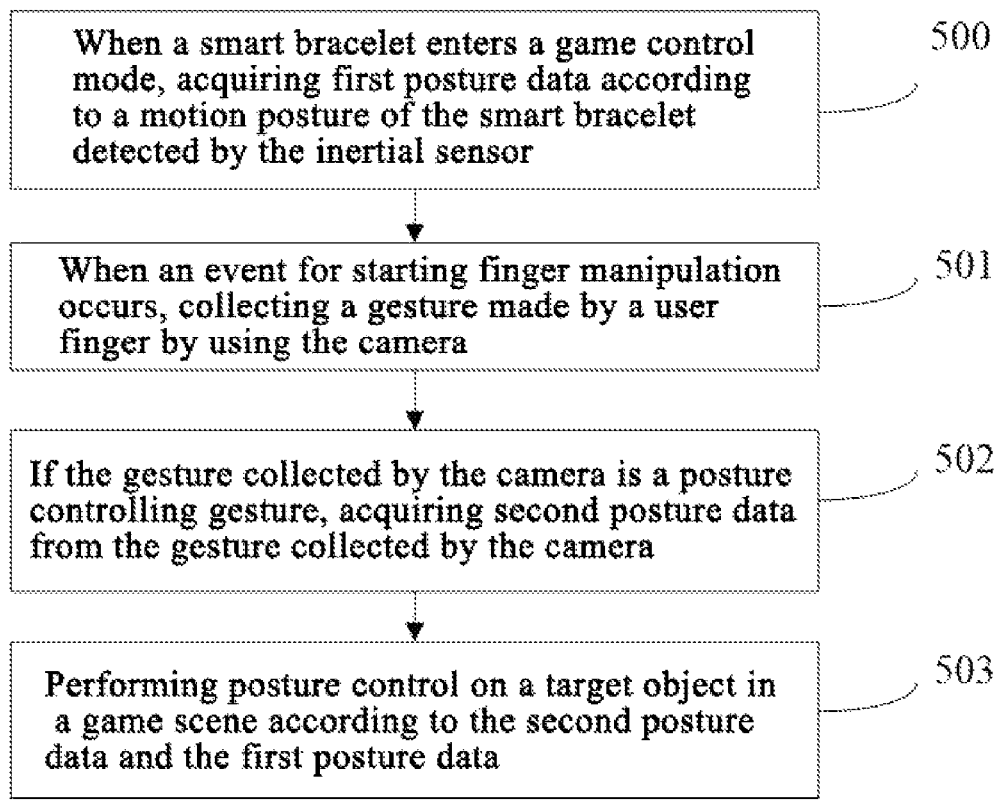
FIG. 5 is a flowchart of a game control method based on a smart bracelet according to an embodiment of the present disclosure.

FIG. 5 is a flowchart of a game control method based on a smart bracelet according to an embodiment of the present disclosure. As shown in FIG. 5, the method comprises:

500: when the smart bracelet enters a game control mode, acquiring first posture data according to a motion posture of the smart bracelet detected by the inertial sensor;

501: when an event for starting finger manipulation occurs, collecting a gesture made by a user finger by using the camera;

502: if the gesture collected by the camera is a posture controlling gesture, acquiring second posture data from the gesture collected by the camera;

503: performing posture control on a target object in a game scene according to the second posture data and the first posture data.

In an alternative embodiment, the step of acquiring second gesture data from the gesture collected by the camera comprises:

acquiring a plurality of user gesture images acquired by the camera, wherein the plurality of user gesture images include the gesture and are acquired continuously;

identifying a motion posture of the user finger under the gesture from the plurality of user gesture images based on an image processing technology; and generating the second posture data according to the motion posture of the user finger under the gesture that has been identified.

In an alternative embodiment, the step of generating the second posture data according to the motion posture of the user finger under the gesture that has been identified comprises:

converting the motion posture of the user finger under the gesture into displacement change data and angle change data; and generating the second posture data according to the displacement change data and angle change data obtained by conversion.

In an alternative embodiment, the step 503 comprises:

superimposing the first posture data and the second posture data to obtain target posture data; and performing posture control on the target object in the game scene according to the target posture data.

In an alternative embodiment, the method further comprises:

if the gesture collected by the camera is an instructional gesture, determining a target operational instruction corresponding to the gesture collected by the camera based on a preset correspondence between instructional gestures and operational instructions;

performing instruction control on the game scene according to the target operational instruction; and performing posture control on a target object in the game scene according to the first posture data.

In an alternative embodiment, the method further comprises:

when an event for starting finger manipulation occurs, turning on a first processor of the smart bracelet, and, by the first processor, acquiring first posture data according to a motion posture of the smart bracelet detected by the inertial sensor; acquiring second posture data from the gesture collected by the camera when the gesture collected by the camera is a posture controlling gesture; and performing posture control on a target object in the game scene according to the second posture data and the first posture data; and when an event for ending finger manipulation occurs, turning off the first processor, turning on a second processor of the smart bracelet, and, by the second processor, acquiring first posture data according to a motion posture of the smart bracelet detected by the inertial sensor; and performing posture control on a target object in the game scene according to the first posture data;

wherein the first processor has a greater processing capability than the second processor.

Correspondingly, the embodiments of the present disclosure also provide a computer readable storage medium storing computer instructions. When executed, the computer instructions can implement steps in the above method embodiments that may be performed by a smart bracelet.

All embodiments in this specification are described in a parallel or progressive manner. The description of each embodiment focuses on differences from other embodiments, and reference can be made among the embodiments for their same or similar features. For the apparatus disclosed in the embodiments, since it corresponds to the method disclosed in the embodiments, the description is simple, and the relevant details can be found in the description of method.

As will be appreciated by a person skilled in the art, the embodiments of the present disclosure may be embodied as a system, method or computer program product. Thus, the present disclosure may take the form of an entirely hardware embodiment, an entirely software embodiment, or an embodiment combining software and hardware. Furthermore, the present disclosure may take the form of a computer program product embodied on one or more computer-usable storage media (including but not limited to magnetic storage media, CD-ROMs, optical storage media, etc.) having computer-usable program codes recorded thereon.

The present disclosure is described below with reference to flowchart illustrations and/or block diagrams of methods, apparatus (systems) and computer program products according to the embodiments of the present disclosure. It will be understood that each block of the flowchart illustrations and/or block diagrams, and combinations of blocks in the flowchart illustrations and/or block diagrams can be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including an instruction apparatus that implements the functions specified in the flowchart one or more processes and/or block diagram block or blocks.

These computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart one or more processes and/or block diagrams.

In a typical configuration, a computing device includes one or more processors (CPUs), input/output interfaces, network interfaces, and memory The memory may include non-persistent memory in computer readable media, random access memory (RAM) and/or non-volatile memory, and the like, such as read only memory (ROM) or Flash RAM. Memory is an example of a computer readable medium.

Computer readable media includes both permanent and non-permanent, removable and non-removable media that may be stored by any method or technology. The information may be computer readable instructions, data structures, modules of a program, or other data. Examples of storage media of a computer include, but are not limited to, phase change memory (PRAM), static random access memory (SRAM), dynamic random access memory (DRAM), other types of random access memory (RAM), read only memory (ROM), electrically erasable programmable read-only memory (EEPROM), flash memory or other memory technology, read only memory (CD-ROM), digital versatile disks (DVD) or other optical storage, magnetic cassettes, magnetic tapes, magnetic disk storage or other magnetic storage devices, or any other non-transmission medium, may be used to store information that may be accessed by a computing device. As defined herein, computer readable media does not include transitory media such as modulated data signals and carriers.

It should also be noted that relational terms, such as first and second, etc. are used herein to distinguish one entity or operation from another entity or operation without necessarily requiring or implying any such actual relationship or order between such entities or operations. Moreover, the terms "comprise", "include" or any other variation thereof, are intended to cover a non-exclusive inclusion, such that a process, method, article, or apparatus that comprises a series of elements not only includes those elements but also includes other elements not expressly listed, or that is an element inherent to such process, method, article, or apparatus. In the absence of more constraints, an element defined by the sentence "comprising a . . . " does not exclude the case that there are other same elements in the process, method, article or apparatus that includes the element.

The above are only embodiments of the present disclosure and are not intended to limit the present disclosure. Various modifications and variations will be apparent to those skilled in the art. Any modifications, equivalents, improvements, etc. made within the spirit and principle of the present disclosure shall all be included within the scope of the claims of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A game control method based on a smart bracelet, comprising:
    when the smart bracelet enters a game control mode, acquiring first posture data according to a motion posture of the smart bracelet detected by an inertial sensor;
    when an event for starting finger manipulation occurs, collecting a gesture made by a user finger by using a camera;
    if the gesture collected by the camera is a posture controlling gesture, acquiring second posture data from the gesture collected by the camera; and
    performing posture control on a target object in a game scene according to the second posture data and the first posture data,
    wherein when an event for starting finger manipulation occurs, turning on a first processor of the smart bracelet, and, by the first processor, acquiring first posture data according to a motion posture of the smart bracelet detected by the inertial sensor; acquiring second posture data from the gesture collected by the camera when the gesture collected by the camera is a posture controlling gesture; and performing posture control on a target object in the game scene according to the second posture data and the first posture data; and
    when an event for ending finger manipulation occurs, turning off the first processor, turning on a second processor of the smart bracelet, and, by the second processor, acquiring first posture data according to a motion posture of the smart bracelet detected by the inertial sensor; and performing posture control on a target object in the game scene according to the first posture data;
    the first processor has a greater processing capability than the second processor.

2. The method according to claim 1, wherein acquiring second gesture data from the gesture collected by the camera comprises:
    acquiring a plurality of user gesture images acquired by the camera, wherein the plurality of user gesture images include the gesture and are acquired continuously;
    identifying a motion posture of the user finger under the gesture from the plurality of user gesture images based on an image processing technology; and
    generating the second posture data according to the motion posture of the user finger under the gesture that has been identified.

3. The method according to claim 2, wherein generating the second posture data according to the motion posture of the user finger under the gesture that has been identified comprises:
    converting the motion posture of the user finger under the gesture into displacement change data and angle change data; and
    generating the second posture data according to the displacement change data and angle change data obtained by conversion.

4. The method according to claim 1, wherein performing posture control on a target object in a game scene according to the second posture data and the first posture data comprises:
    superimposing the first posture data and the second posture data to obtain target posture data; and
    performing posture control on the target object in the game scene according to the target posture data.

5. The method according to claim 1, further comprising:
    if the gesture collected by the camera is an instructional gesture, determining a target operational instruction corresponding to the gesture collected by the camera based on a preset correspondence between instructional gestures and operational instructions;
    performing instruction control on the game scene according to the target operational instruction; and
    performing posture control on a target object in the game scene according to the first posture data.

6. A smart bracelet, comprising a controller, an inertial sensor, and a camera; wherein
    the camera faces toward the direction of the user finger when the smart bracelet is in a worn state;
    the controller is for:
    when the smart bracelet enters a game control mode, acquiring first posture data according to a motion posture of the smart bracelet detected by the inertial sensor;
    when an event for starting finger manipulation occurs, collecting a gesture made by a user finger by using the camera;
    if the gesture collected by the camera is a posture controlling gesture, acquiring second posture data from the gesture collected by the camera; and performing posture control on a target object in a game scene according to the second posture data and the first posture data, wherein the controller comprises a first processor and a second processor;

when an event for starting finger manipulation occurs, the second processor enters a turned-off state, and the first processor is for: acquiring first posture data according to a motion posture of the smart bracelet detected by the inertial sensor, acquiring second posture data from the gesture collected by the camera when the gesture collected by the camera is a posture controlling gesture; and performing posture control on a target object in the game scene according to the second posture data and the first posture data; and when an event for ending finger manipulation occurs, the first processor enters a turned-off state, and the second processor is for: acquiring first posture data according to a motion posture of the smart bracelet detected by the inertial sensor; and performing posture control on a target object in the game scene according to the first posture data:

the first processor has a greater processing capability than the second processor.

7. The smart bracelet according to claim 6, wherein when acquiring second gesture data from the gesture collected by the camera, the controller is for:

acquiring a plurality of user gesture images acquired by the camera, wherein the plurality of user gesture images include the gesture and are acquired continuously;

identifying a motion posture of the user finger under the gesture from the plurality of user gesture images based on an image processing technology; and generating the second posture data according to the motion posture of the user finger under the gesture that has been identified.

8. The smart bracelet according to claim 7, wherein when generating the second posture data according to the motion posture of the user finger under the gesture that has been identified, the controller is for:

converting the motion posture of the user finger under the gesture into displacement change data and angle change data; and generating the second posture data according to the displacement change data and angle change data obtained by conversion.

9. The smart bracelet according to claim 6, wherein when performing posture control on a target object in a game scene according to the second posture data and the first posture data, the controller is for:

superimposing the first posture data and the second posture data to obtain target posture data; and performing posture control on the target object in the game scene according to the target posture data.

* * * * *